United States Patent [19]  
Jones et al.

[11] 3,870,685  
[45] Mar. 11, 1975

[54] CATALYTIC METHOD FOR PRODUCING AROMATIC POLYAMIDES

[75] Inventors: Rufus S. Jones, Dover; Anthony B. Conciatori, Chatham, both of N.J.

[73] Assignee: Celanese Corporation, New York, N.Y.

[22] Filed: June 15, 1973

[21] Appl. No.: 370,273

[52] U.S. Cl.......... 260/78 R, 260/47 CZ, 260/63 N, 260/65
[51] Int. Cl............................................. C08g 20/20
[58] Field of Search ................................. 260/78 R

[56] References Cited
UNITED STATES PATENTS

| | | | |
|---|---|---|---|
| 2,244,192 | 6/1941 | Flory | 260/78 R |
| 3,063,966 | 11/1962 | Kwolek et al. | 260/78 R |
| 3,329,653 | 7/1967 | Beavers et al. | 260/78 R |

Primary Examiner—Harold D. Anderson

[57] ABSTRACT

High molecular weight wholly aromatic linear polyamides of film and fiber-forming grade are prepared by direct condensation of monomeric aromatic dicarboxylic acids and aromatic diamines in about a mole to mole ratio in the presence of an aromatic sulfone and a catalytic amount of a boric acid and/or a sulfonic acid or derivatives thereof. The condensation product using the noted catalyst is polymerized to higher inherent viscosities than that obtained without a catalyst under similar conditions. The described process is particularly advantageous because substantially shorter polymerization times are required to obtain film and fiber-forming polymers.

13 Claims, No Drawings

CATALYTIC METHOD FOR PRODUCING AROMATIC POLYAMIDES

INTRODUCTION

This invention relates to the production of aromatic polyamides and more particularly to the production of high molecular weight, linear fiber-forming wholly aromatic polyamides such as those which are the condensation product of isophthalic acid, terephthalic acid and meta and para phenylenediamines. These polyamides are more particularly described as polyparaphenylene terephthalamide, polymetaphenylene terephthalamide, polyparaphenylene isophthalamide, polymetaphenylene isophthalamide, analogs, copolymers and mixtures thereof.

BACKGROUND OF THE INVENTION

In recent years, considerable interest has been generated in wholly aromatic polyamides. A number of methods have been described for preparing such polymers but, in general, such methods have been undesirable in one or more respects. The most widely considered method for producing such polymers involves condensation of the corresponding aromatic acid chloride with the aromatic diamine.

Although commercially most polyamides are prepared by melt polymerization techniques involving high temperatures up to about 300°C, high molecular weight wholly aromatic polyamides of suitable color cannot be prepared by such melt polymerization techniques because the high temperatures required for melt polymerization foster reactions other than the desired amide formation so that only highly colored low molecular weight or cross-linked products are obtained. Other proposed methods such as the utilization of the acid chloride as the reactant present various undesirable features such as difficulty in preparing the reaction monomers, the production of undesirable by-products, some of which may act as polymerization inhibitors and the like.

Of the various other methods known for producing such polymers, each generally has serious shortcomings and is undesirable in one or more respects either because of the low relative yields, the multi-step reactions involved or the relatively high cost of reactants and/or monomeric starting materials. It has been recently discovered that direct condensation and polymerization of wholly aromatic polyamides can be accomplished. Such method eliminates undesirable by-product formation, the preparation of special reactant monomers and the like thereby substantially improving economics. The present invention provides a catalyst for such direct condensation reactions which reduces reaction times and results in more preferred higher inherent viscosities. The utilization of such catalyst systems can further result in the elimination of additional solid state polymerizations to achieve fiber and film-forming grade polymers.

THE INVENTION

In accordance with the invention, a method for preparing high molecular weight aromatic polyamides is provided comprising heating in the substantial absence of oxygen an aromatic dicarboxylic acid and an aromatic diamine in about a mole to mole ratio in the presence of an aryl sulfone and a catalyst amount of a boric acid or an organic sulfonic acid or acid yielding derivatives thereof and mixtures thereof to a temperature above the melting point of said sulfone to just below the decomposition temperature of the reactants and continuing said heating with the removal of condensation by-products for a period of time sufficient to form a product having an inherent viscosity of at least 0.4 as measured using a solution of 0.4 grams of product per 100 milliliters of concentrated aqueous sulfuric acid (97–99% by weight) at 25°C.

The polymer is preferably further polymerized to an inherent viscosity within the range of 1.0 to 5.0 with or without an intermediate step comprising the separation of the sulfone from the reaction product. If such a separation step is utilized, the product can be further polymerized under solid state conditions either with or without a heat transfer diluent at temperatures in excess of 300°C but below the decomposition temperature of the polymer.

DETAILS OF THE INVENTION

In the most preferred embodiment of the invention, the monomeric materials are condensed first to an oligomer and subsequently polymerized to a high polymer fiber-forming and film-forming viscosity. The monomers are preferably dicarboxylic acids of the formula HOOCArCOOH, and diamines of the formula $H_2NArNH_2$ wherein Ar is selected from the group consisting of meta and para

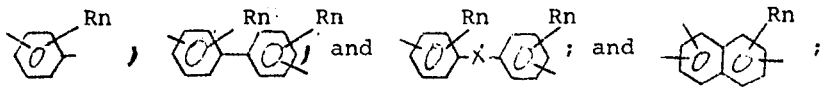

and mixtures thereof wherein R is any mono functional substituent inert under the reaction conditions, $n$ is an integer of 0 to 4, X is —O—,

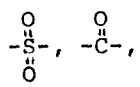

cycloalkylidene of up to 8 carbon atoms or $CY_2$, wherein C is carbon and Y is hydrogen, mononuclear aryl or alkyl of 1 to 6 carbon atoms. The most preferred dicarboxylic acids are terephthalic acid, isophthalic acid and mixtures thereof. The most preferred diamines utilized in the reaction are paraphenylenediamine, metaphenylenediamine and mixtures thereof. While the preferred dicarboxylic acids and diamines produced the most desired film and fiber-forming properties, certain variations in such properties as well as entirely different properties can be realized by using other dicarboxylic acids as reactants such as those exemplified by the following, all of which are within the scope of the present invention.

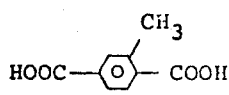
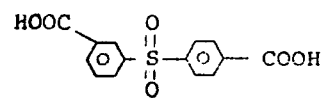

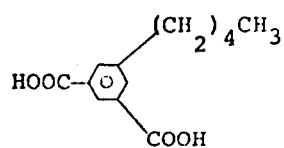
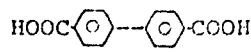
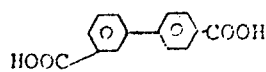
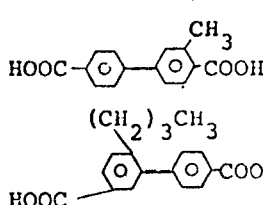
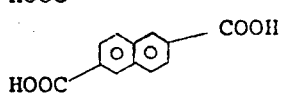
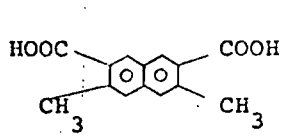
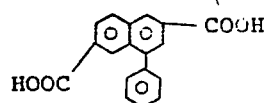
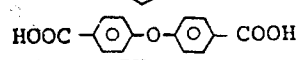
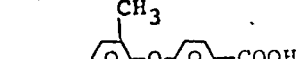
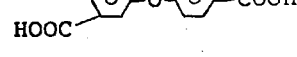
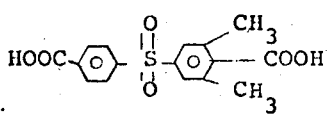
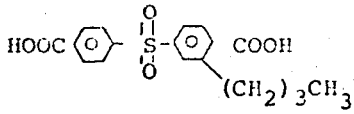
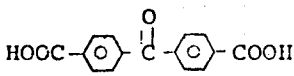
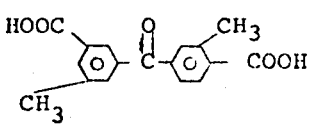
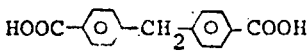
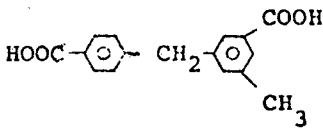
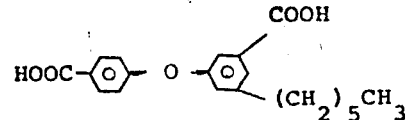
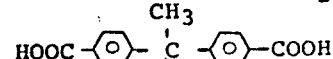
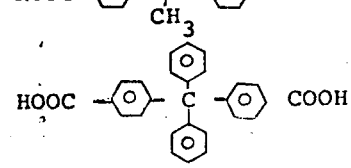
Although the diamine reacted with the dicarboxylic acid is preferably meta or para phenylene diamine, certain other aromatic diamines such as the following can be used with correspondingly good results.
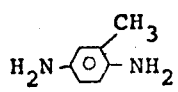
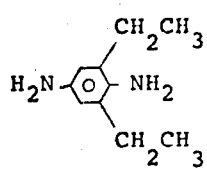
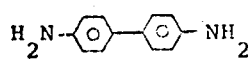
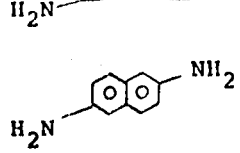
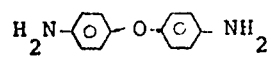
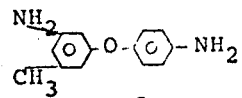
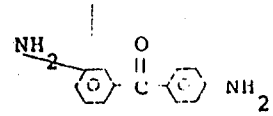
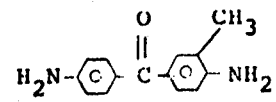

-Continued

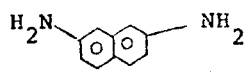
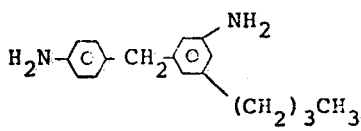

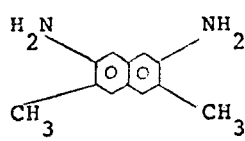
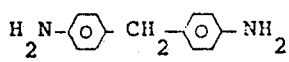

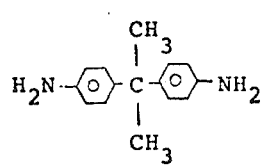

The aryl sulfone is of the formula

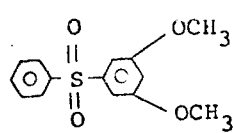

wherein X is hydrogen, aryl, alkyl or alkoxy of 1 to 6 carbon atoms, $n$ is 1 to 3, R is

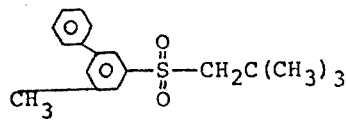

or alkyl of 1 to 12 carbon atoms. The sulfones used herein are liquid at the monomer condensation temperature and do not decompose at the elevated temperatures utilized. Superatmospheric pressures can be utilized if desired if the sulfone tends to volatilize at the desired reaction temperature. Typical of the sulfones used in the present invention include diphenylsulfone, methylphenylsulfone, butylphenylsulfone ture. Excessive amounts are generally of no benefit and merely increase the amount of sulfone to be separated from the polymer and recovered after the condensation.

The catalyst of the present invention is boric acid or acid yielding derivatives thereof or an organic sulfonic acid and acid yielding derivatives thereof. The most preferred catalyst is a combination of boric acid and sulfonic acid. Inclusive of boric acid are the anhydride thereof, aryl boronic acids, alkyl, aryl, acyl and aroyl borates and the like boron compounds of 1 to 18 carbon atoms which yield boric acid under the reaction conditions. In particular, the lower alkyl, aryl, acyl, and aroyl borates having 1 to 6 carbon atoms are inclusive of desirable boric acid yielding derivatives.

The co-catalysts particularly effective are the aromatic and alkyl sulfonic acids having carbon rings and/or chains of 1 to 16 carbon atoms and their esters. Particularly preferred acids include p-toluene sulfonic acid and benzene sulfonic acid.

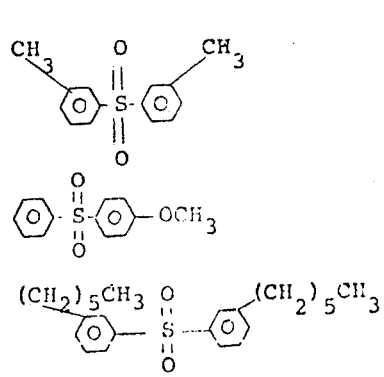

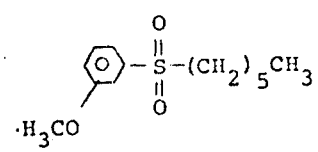

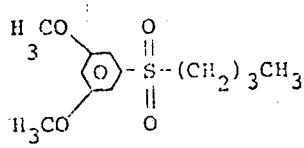

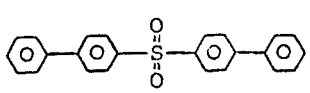

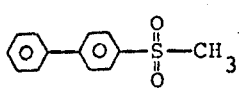

The aryl sulfone is used in an amount corresponding to 100 to 2,500 weight percent and more preferably 300 to 1,500 weight percent of the polymer. The preferred amount is that which is sufficient to partially solubilize the monomer reactants at the reaction tempera- The catalyst is added to the reaction mixture preferably at the commencement of the heating stage. Later additions can be utilized such as during the condensation and at least prior to substantial polymerization. Additions at later stages, such as after substantial polymerization, merely reduce the full benefit of the catalyst.

The amount of catalyst added is a catalytically effective amount, that is an amount which will increase the rate of reaction and/or increase the viscosity of the polymer over a given reaction time and temperature compared to reactions without the catalyst. In some instances, the catalyst will provide means for obtaining inherent viscosities not readily obtainable without the aid of such catalyst. In particular, a catalytically effective amount is from about 0.2 mole percent to about 15 mole percent based on the carboxylic and diamine reactants. The more preferred amount is in the range of 1 to 10 mole percent.

The most preferred catalyst is a combination of boric acid and organic sulfonic acid. Such combination has been found to be more effective than either catalyst alone. When such combination is used, the total amount of catalyst used can be reduced and higher inherent viscosities are obtained under identical reaction conditions than with either boric acid or organic sulfonic acid alone. When the combination catalyst is the boric acid to organic sulfonic acid can be in a molar ratio of between 10:1 to pg,10 1:10, but the more preferred ratio is in the range of about 2:1 to 6:1 boric acid to organic sulfonic acid.

The aromatic dicarboxylic acid and aromatic diamine are preferably reacted in a mole to mole ratio. Such reaction ratio, however, can be varied to utilize up to about a 2 mole percent excess of one reactant depending on the particular properties desired in the resulting polymer. For instance, it is sometimes considered desirable to have a low proportion of carboxylic end groups. A slight excess of diamine will aid in this result. For other uses, a low ratio of amine end groups may be desired and, thus, a corresponding small molar excess of dicarboxylic acid is used. Large excesses of one reactant, unless compensated for in the reaction, tend to limit the molecular weight of the resulting polymer and thus may not provide the more desirable film and fiber-forming viscosities.

In reacting the aromatic discarboxylic acid with the aromatic diamine, a condensation reaction takes place with the elimination of water. An acid group reacts with an amino group to form an amide group. Continuing the condensation, amide oligomers are formed which on further heating at elevated temperatures polymerize to long-chain linear polymers of film and fiber-forming viscosities. During the condensation reaction, the volatilized by-product, water, is preferably removed as it is formed so as to enhance the reaction. If superatmospheric pressures are used in the condensation stage, then it is preferred to continuously or periodically bleed reaction by-product off from the reaction mixture.

The condensation reaction proceeds readily under the influence of heat and temperatures above the melting point of the sulfone and at least above 100°C. At temperatures above about 150° to about 400°C, the condensation reaction proceeds at a desirable reaction rate. The upper temperature range is generally limited by the boiling point of the sulfone unless superatmospheric pressure is used. The temperature is preferably increased over the noted temperature range with consideration being given to the volatility of the reactants. As the condensation reaction proceeds, the temperature is preferably increased to sustain a desirable reaction rate. Excessive rapid heating to the higher temperatures may result in a tendency of the monomer reactants to sublime and/or distill from the reaction mixture. Where it is desirable to control such sublimation and distillation, superatmospheric pressure can be imposed.

The temperature to which the reactants are initially heated is limited on the lower range by the melting point of the sulfone. The sulfone acts as a solvent for the reactants and, therefore, the process does not proceed in the desired manner until the sulfone is liquefied under the influence of heat. At the same time, the boiling point of the sulfone tends to limit the upper temperature range at which the condensation reaction is carried out. Of course, this upper temperature range can be extended by the imposition of superatmospheric pressure.

With the preferred diphenylsulfone, liquefaction takes place in the temperature range of 128° to 129°C at atmospheric pressure. The boiling point of diphenylsulfone is 379°C which adequately encompasses the preferred temperatures for condensation. The other sulfones described herein likewise have ample liquid temperature ranges well within the desired condensation reaction temperatures.

The reaction is continued until the condensation product has an inherent viscosity of at least 0.4 as measured in a solution of 0.4 grams of polymer per 100 milliliters of concentrated sulfuric acid at 25°C. With the preferred sulfones, inherent viscosities in excess of 1.0 are readily obtained.

Inherent viscosities ($\eta$ inh) are determined in accordance with the following equation $$\eta \text{ inh} = (1n \ \eta \text{ rel})/C$$

The relative viscosity ($\eta$ rel) is determined by dividing the flow time in a capillary viscometer of a dilute solution of the polymer by the flow time for the pure solvent. The concentration (C) is 0.4 grams of polymer per 100 cc. of concentrated (97 to 99% aqueous sulfuric acid).

On completion of the condensation, the polymer is preferably polymerized to a viscosity in the range of 1.0 to 5.0. This polymerization can be effected by continued heating of the condensation product while still in the presence of the sulfone. Alternatively, the sulfone can be separated from the polymer and the polymerization continued in solid state form at temperatures in excess of the boiling point of the sulfone. Continued polymerization is preferably carried out at temperatures in excess of 350°C up to just below the decomposition temperature of the polymer. Such polymers are known for their high decomposition temperatures which are in the vicinity of about 470°C depending upon the particular polymer. Therefore, it is particularly desirable for the fastest polymerization rates to utilize temperatures in the range of about 400° to 470°C.

The condensation and polymerization reaction is preferably carried out under a blanket of inert gas such as nitrogen, neon, argon, kyrpton and the like to thereby reduce oxidation products and degradation of the polymer. These reactions are conveniently carried out under atmospheric pressure. However, super and sub atmospheric pressures can be utilized as set forth herein if desired. Subatmospheric conditions can be conveniently utilized primarily after the formation of the oligomer such as to aid in the removal of volatile by-products from the reaction mixture. When superatmospheric pressure is utilized, such as when the sulfone boils below the desired reaction temperature, it is highly desirable to periodically remove low boiling condensation products such as water by distillation to avoid inhibiting further reaction.

While the sulfone acts as a solvent for monomeric material, there are occasions wherein a further diluent is desirably used which also acts as a solvent for the diamine monomers and/or as a heat transfer agent. The diluent, of course, is chosen for its properties of inertness under the reaction conditions, compatibility with the sulfone, boiling point, solubilizing properties of the monomer reactants, specific heat properties and the like. Diluents which boil at temperatures below the reaction temperatures can be used provided superatmospheric pressures are imposed. Diluents which are only solvents for the monomer provide easy separation of the polymer therefrom as the polymer is precipitated from the solution. In addition, such diluents are solvents for the sulfone, and serve to liquefy the reaction mixture at room temperature, thereby providing ease of handling. Advantages and disadvantages can be found for each type of diluent.

Diluents which do not act as a solvent for the polymer and which are desirably used herein include, but are not limited to, aromatic hydrocarbons such as toluene, xylene, polymethylbenzenes, ethylbenzene, the polyethylbenzenes, cumene, naphthalene, the metylnaphthalenes such as alphamethyl naphthalene and beta methyl naphthalene, acenaphthene, polymethylnaphthalenes, biphenyl, diphenylmethane, aliphatic and cycloaliphatic hydrocarbons such as cosane, heptadecane, tetrahydronaphthalene, decahydronaphthalene, relatively high boiling petroleum hydrocarbon fractions such as kerosenes and gas oils, ethers such as diphenylether and ditolyl ether.

The diluent can be used in an amount ranging from about 50 to 1,500 percent based on the weight of the polymer. The higher proportions of this range are preferably used with diluents which act as solvents for the polymer such that workable viscosities are obtained. The lower portion of this range, i.e. 50 to about 300 percent, is preferably used with the nonsolvent diluents and/or under conditions where the diluent is removed from the reaction prior to the completion of the polymerization stage. Such removal can be accomplished by filtering, evaporating, steam stripping and the like.

Alternatively, a diluent need not be utilized in the condensation reaction because the sulfone acts as such for the polymer. However, on completion of the condensation and wherein the polymerization is desirably furthered after the separation of the sulfone from the polymer, such diluents can be added and used primarily as heat transfer agents or as solvents for the polymer on further polymerization.

As has been pointed out, the diluent can be retained with the reactants through the completion of the polymerization. Alternatively, the diluent can be removed after the condensation of the monomers to an oligomer stage. It is to be noted, however, that many of the diluents useful herewith perform the valuable additional functions of a heat transfer agent in further solid state polymerizations and of solvent for the sulfone, thereby simplifying the separation of polymer from the sulfone.

The resulting polymer is particularly useful in the preparation of fibers, films and fibrils by wet or dry spinning and the like extruding techniques. In the spinning or shaping of the polymer into a fiber, film or like structure, it is preferable to have an inherent viscosity of at least above about 0.7 and more preferably above 1.0 as higher inherent viscosities generally contribute to higher fiber strength.

Polymers of the present invention can be shaped from solutions of sulfuric acid, preferably of a concentration of 95–100%, oleum, i.e. sulfuric acid containing up to 20% or higher free $SO_3$, hydrofluoric acid and other suitable strong inorganic acids, and organic solvents such as tetramethylurea, N,N-dimethylacetamide, N,N-dimethylisobutylamide, 1,3-dimethylimidazolidinone-2, N-methylpyrrolidone-2, hexamethylphosphoramide and the like.

The invention will be more fully described by reference to the examples which illustrate certain preferred embodiments of the invention. Unless otherwise indicated, all parts and percentages in the examples and claims are by weight.

EXAMPLE I

Polyparaphenylene terephthalamide was produced in accordance with the present invention by charging to a reactor 5.41 parts of paraphenylenediamine, 8.31 parts of terephthalic acid, 100 parts of diphenylsulfone, 100 parts of paraxylene and a catalyst comprising 0.10 part of paratoluene sulfonic acid and 0.30 parts of boric acid. The reaction vessel was then flushed with nitrogen and evacuated several times to remove oxygen. Heating was commenced with stirring under atmospheric pressure and nitrogen flow to a temperature of 150°C at which time distillation commenced. Heating was continued and the temperature increased to 375°C over a period of twenty minutes at which time water of condensation was noted in the distillation column. The temperature was maintained at 375°C for 3½ hours. The product was then cooled and the diphenylsulfone extracted into acetone. After washing several times with warm acetone, the resulting product was vacuum dried at 80°C. 11.7 parts of paraphenylene terephthalamide product was recovered having an inherent viscosity of 2.09 in concentrated sulfuric acid.

The resulting polymer could be spun into fibers or formed into films or alternatively further polymerized in the solid state in the presence of 200 weight percent, based on the polymer, of diphenylether at a temperature of 400°C until a higher inherent viscosity is reached.

EXAMPLE II

As a comparison to illustrate the effect of the catalyst system of the present invention, polyparaphenylene terephthalamide was again produced under identical reaction conditions as Example I without the use of the catalyst of the present invention. The reaction was carried out by charging 5.41 parts of paraphenylenediamine, 8.31 parts of terephthalic acid, 100 parts of diphenylsulfone and 100 parts of para-xylene. The reactor was purged with nitrogen to remove oxygen. Heating was commenced under a nitrogen blanket. As the temperature approached 328°C, water was detected distilling from the reaction mixture. The temperature was increased to 375°C and maintained at that temperature for 3½ hours. The resulting product was then cooled and the diphenylsulfone separated by dissolving the same with acetone and filtering. The filtrate was washed several times with warm acetone. The recovered polymer was then dried in a vacuum oven at 80°C. 11.5 parts of polymer was recovered having an inherent viscosity of 1.11 in concentrated sulfuric acid. Such viscosity, while being of fiber-forming grade, is low when contemplated for the highest strength obtainable with such polymers.

EXAMPLE III

The following example illustrates the preparation of polyparaphenylene terephthalamide utilizing only boric acid as a catalyst. The same procedure and proportions as in Example I were followed so as to determine the effect of the boric acid catalyst alone. The reaction was commenced by charging to a reactor 5.41 parts of paraphenylenediamine, 8.31 parts of terephthalic acid, 100 parts of diphenylsulfone, 100 parts of para-xylene and 0.30 parts of boric acid. The reaction vessel was then flushed with nitrogen and evacuated several times to remove oxygen.

Heating was commenced with stirring under atmospheric pressure and nitrogen flow to a temperature of 150°C at which time distillation of xylene commenced. Heating was continued and the temperature increased in a period of 20 minutes to 375°C. The temperature was maintained at 375°C for 3½ hours. At the end of this reaction period, the product was cooled and the diphenylsulfone extracted into acetone. The product was washed several times with warm acetone and dried in a vacuum oven at 80°C. 11.9 parts of para-phenylene terephthalamide product was recovered having an inherent viscosity of 1.45 in concentrated sulfuric acid.

This viscosity increase represents more than a thirty percent increase in viscosity utilizing the boric acid compared to Example II without a catalyst.

EXAMPLE IV

The reaction of Example III was repeated with the exception that 0.10 parts of para-toluene sulfonic acid was utilized in place of the boric acid catalyst. Again, the resulting product showed an increase in viscosity utilizing the para-toluene sulfonic acid compared to the reaction of Example II without catalyst.

EXAMPLE V

The reaction of Example I was again repeated utilizing different proportions of para-toluene sulfonic acid and boric acid. The proportions of other reactants were the same with the exception of that 0.10 parts of para-toluene sulfonic acid and 0.15 parts of boric acid were used. After reacting under identical reaction conditions as Example I for 3½ hours, the resulting product had an inherent viscosity of 2.15 and a yield of 11.7 parts of product.

In the same manner, rather than utilizing boric acid, the esters and partial esters thereof are used with correspondingly good results. Additionally, rather than utilizing para-toluene sulfonic acid, other organic sulfonic acids as disclosed herein are used with correspondingly good results.

In the same manner, the corresponding polyparaphenylene isophthalamide, the polymetaphenylene terephthalamide, polymetaphenylene isophthalamide and mixtures thereof are condensed and polymerized to inherent viscosities of 1.0 and more. Additionally, other aromatic sulfones as described herein are utilized with correspondingly good results. The sulfones are conveniently recovered on completion of the reaction and reused in subsequent condensations.

While there have been described more particularly the preferred embodiments of the present invention particularly with respect to the condensation and polymerization of the most preferred polymer, polyparaphenylene terephthalamide, it will be readily recognized by those skilled in the art that the various other wholly aromatic polyamides described herein are polymerized in the same manner with correspondingly good results. As such, it is intended to cover the invention broadly, being limited only by the following claims.

What is claimed is:

1. A method for preparing high molecular weight aromatic carbocyclic polyamides comprising heating in the substantial absence of oxygen an aromatic carbocyclic dicarboxylic acid and an aromatic carbocyclic diamine in about a mole to mole ratio in the presence of about 100 to 2500 percent, by weight, based on the polymer weight, of an aryl sulfone and about 0.2 to 15 mole percent, based on the reactants, of a combination of boric acid and an, aryl or alkyl sulfonic acid of from 1 to 16 carbon atoms wherein the molar ratio of the boric acid to organic sulfonic acid is between about 10:1 and 1:10, to a temperature above the melting point of said sulfone to just below the decomposition temperature of the reactants and continuing said heating with the removal of condensation by-products for a period of time sufficient to form a product having an inherent viscosity of at least 0.4 as measured using a solution of 0.4 grams of product per 100 milliliters of concentrate, 97–99% by weight, aqueous sulfuric acid at 25°C.

2. The method of claim 1 wherein the catalyst is a combination of boric acid and an organic sulfonic acid or acid forming derivatives thereof in a molar ratio of about 2:1 to 6:1 boric acid to organic sulfonic acid.

3. The method of claim 2 wherein the boric acid and organic sulfonic acid are in a molar ratio of between 10:1 and 1:10.

4. The method of claim 3 wherein boric acid to organic sulfonic acid is in a molar ratio of 2:1 to 6:1.

5. The method of claim 1, wherein the organic sulfonic acid is selected from the group consisting of para-toluene sulfonic acid and benzene sulfonic acid.

6. The method of claim 1, wherein the resulting product is further polymerized to increase the inherent viscosity to a value in the range of 1.0 to 5.0.

7. The method of claim 1, wherein the dicarboxylic acid is of the formula HOOCArCOOH and the diamine is of the formula $H_2NArNH_2$, wherein Ar is selected from the group consisting of meta and para

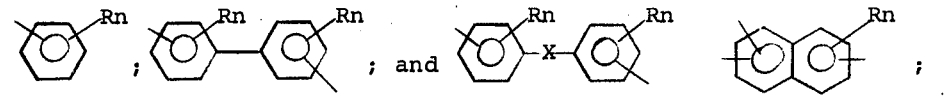

and mixtures thereof wherein R is any monofunctional substituent inert under the reaction conditions, $n$ is an integer of 0 to 4, X is —O—,

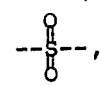

—C—, cycloalkylidene of up to 8 carbon atoms, or $CY_2$ wherein the C is carbon and Y is hydrogen, mononuclear aryl or alkyl of 1 to 6 carbon atoms.

8. The method of claim 7 wherein the dicarboxylic acid is selected from the group consisting of terephthalic acid, isophthalic acid and mixtures thereof.

9. The method of claim 7 wherein the diamine is selected from the group consisting of metaphenylenediamine, paraphenylenediamine and mixtures thereof.

10. The method of claim 1, wherein a nonreactive diulent is present in addition to the sulfone in an amount of 50 to 1,500 percent based on the weight of the polymer.

11. The method of claim 1, wherein the aryl sulfone is of the formula

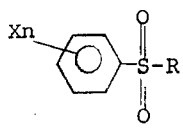

wherein X is hydrogen, aryl, alkyl or alkoxy of 1 to 6 carbon atoms, $n$ is 1 to 3 and R is

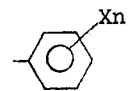

or alkyl of 1 to 12 carbon atoms.

12. The method of claim 11 wherein the sulfone is diphenyl sulfone.

13. The method of claim 11 wherein the sulfone is present in an amount corresponding to 100 to 2,500 weight percent of the polymer.

* * * * *